(12) United States Patent
Squalli

(10) Patent No.: US 7,770,750 B2
(45) Date of Patent: Aug. 10, 2010

(54) VESSEL FOR PRESSURIZED TREATMENT OF OBJECTS

(75) Inventor: Jaafar Squalli, Lesquin (FR)

(73) Assignee: ECODAS, Societe par Action Simplifiee, Roubaix (FR)

( * ) Notice: Subject to any disclaimer, the term of this patent is extended or adjusted under 35 U.S.C. 154(b) by 378 days.

(21) Appl. No.: 10/585,312

(22) PCT Filed: Jan. 3, 2005

(86) PCT No.: PCT/FR2005/000003

§ 371 (c)(1),
(2), (4) Date: Jul. 6, 2006

(87) PCT Pub. No.: WO2005/077517

PCT Pub. Date: Aug. 25, 2005

(65) Prior Publication Data

US 2007/0051732 A1  Mar. 8, 2007

(30) Foreign Application Priority Data

Jan. 14, 2004  (FR) .................................. 04 00320

(51) Int. Cl.
*B65D 45/00* (2006.01)
(52) U.S. Cl. ............. 220/316; 220/4.12; 220/319; 220/320; 220/321; 220/378; 292/256.65
(58) Field of Classification Search ................. 220/4.12, 220/316, 319, 320, 321, 378, 686; 292/256.65
See application file for complete search history.

(56) References Cited

U.S. PATENT DOCUMENTS

| 1,750,056 | A | * | 3/1930 | Sheaffer | 29/233 |
| 3,789,776 | A | | 2/1974 | Funkey | |
| 4,288,001 | A | | 9/1981 | Lankston | |
| 4,312,369 | A | * | 1/1982 | Mullen et al. | 131/290 |
| 4,347,944 | A | | 9/1982 | Moldrup | |
| 5,762,227 | A | * | 6/1998 | Mitchell | 220/321 |
| 6,401,958 | B1 | * | 6/2002 | Foss et al. | 220/321 |

FOREIGN PATENT DOCUMENTS

| DE | 33 12 179 C1 | 3/1984 |
| DE | 200 08 919 U1 | 10/2000 |

* cited by examiner

*Primary Examiner*—Anthony Stashick
*Assistant Examiner*—Elizabeth Volz
(74) *Attorney, Agent, or Firm*—Kenyon & Kenyon LLP

(57) ABSTRACT

The present invention relates to a vessel intended in particular for treating articles under pressure, the vessel comprising a body, at least one lid, and connection means between said body and said at least one lid. According to the invention, the connection means comprise:
- an open clamping ring having a U-shaped section defining a groove suitable for clamping together the flanges of the lid and the body; and
- engagement-and-disengagement means enabling the clamping ring to be deformed and moved relative to the flanges in such a manner as to enable the vessel to be opened and closed.

10 Claims, 4 Drawing Sheets

VESSEL FOR PRESSURIZED TREATMENT OF OBJECTS

This is a 371 national phase application of PCT/FR2005/000003 filed 3 Jan. 2005, which claims priority to French Patent Application No. 0400320 filed 14 Jan. 2004, the contents of which are incorporated herein by reference.

The present invention relates to a vessel, in particular for treating articles under pressure.

FIELD OF THE INVENTION

A particular application of the invention lies in treating toxic waste such as hospital waste.

Nevertheless, although particularly intended for such applications, said vessel could equally well be used for treating any other article, and in particular food products.

BACKGROUND OF THE INVENTION

Installations are already known that comprise a vessel for treating waste and in particular hospital waste under pressure. In that type of installation, the waste is treated under high pressure, which implies using a vessel presenting both high strength and good sealing at the connection between the lid of the vessel and its body. These constraints at the connection between the lid and the body are also to be found in other fields and in particular in the agrifood industry where operations are performed in particular of transforming food products under pressure.

A first type of connection between the body and the lid of the vessel is already known for complying with these constraints. In that first type of connection, the lid has a first circular clamping ring presenting studs extending transversely relative to the clamping ring, said clamping ring co-operating with a second clamping ring placed at the top portion of the body and presenting slots for passing the studs. In that type of embodiment, locking is achieved by inserting the studs of the first clamping ring into the slots of the second clamping ring and then pivoting the lid relative to the body, thereby locking the two clamping rings relative to each other. Nevertheless, that type of connection presents drawbacks and in particular requires complex machining when making the clamping rings. In addition, in that type of connection, it is necessary to provide very accurate guidance for the clamping rings. When opening the vessel, it is also necessary to raise the entire lid in order to be able to separate the clamping ring of the lid from the clamping ring of the body.

A second connection device between the lid and the body of a vessel is also known. That device consists in using a half clamping ring on the lid co-operating with a half clamping ring on the body of the vessel, connection being achieved by pivoting the lid by means of an actuator in order to interconnect the two half clamping rings.

That type of connection enables the machining operations to be simplified compared with the first above-mentioned device. However it also presents other drawbacks including, specifically, the fact that it presents less resistance to tearing apart the two portions of the half clamping rings that are not connected by the actuator.

OBJECTS AND SUMMARY OF THE INVENTION

An object of the present invention is to mitigate the above-mentioned drawbacks and to propose a vessel, in particular for treating articles under pressure, that includes connection means providing the vessel with good sealing and great strength against pressure.

Another object of the invention is to provide a vessel in which the connection means between the body and the lid are constituted by elements that are relatively easy to machine.

Another object of the present invention is to provide a vessel in which the lid can be opened and closed quickly and reliably.

The invention thus provides a vessel, in particular for treating articles under pressure, the vessel comprising a body, at least one lid, and connection means for connecting the body and said at least one lid.

According to the invention, the connection means comprise:

an open clamping ring having a U-shaped section defining a groove suitable for clamping together the flanges of the lid and the body; and engagement-and-disengagement means enabling the clamping ring to be deformed and moved relative to the flanges in such a manner as to enable the vessel to be opened and closed.

BRIEF DESCRIPTION OF THE DRAWINGS

Other characteristics and advantages of the invention appear more clearly on reading the following description of a preferred embodiment, which description is given purely by way of non-limiting example and with reference to the accompanying drawings, in which.

MORE DETAILED DESCRIPTION

Figure 1:
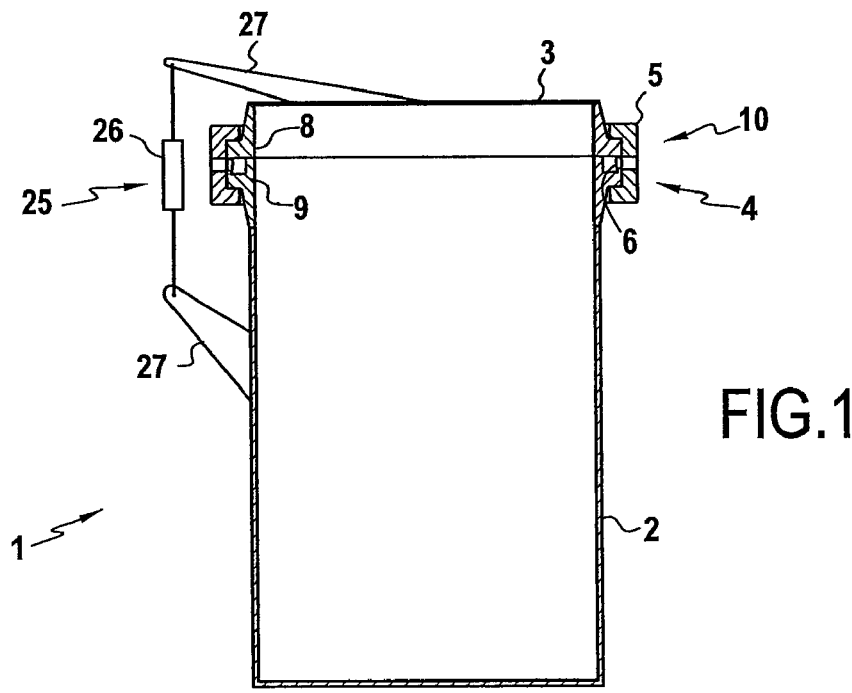
FIG. 1 is a diagrammatic section view of a vessel made in accordance with the invention.
Figure 6:
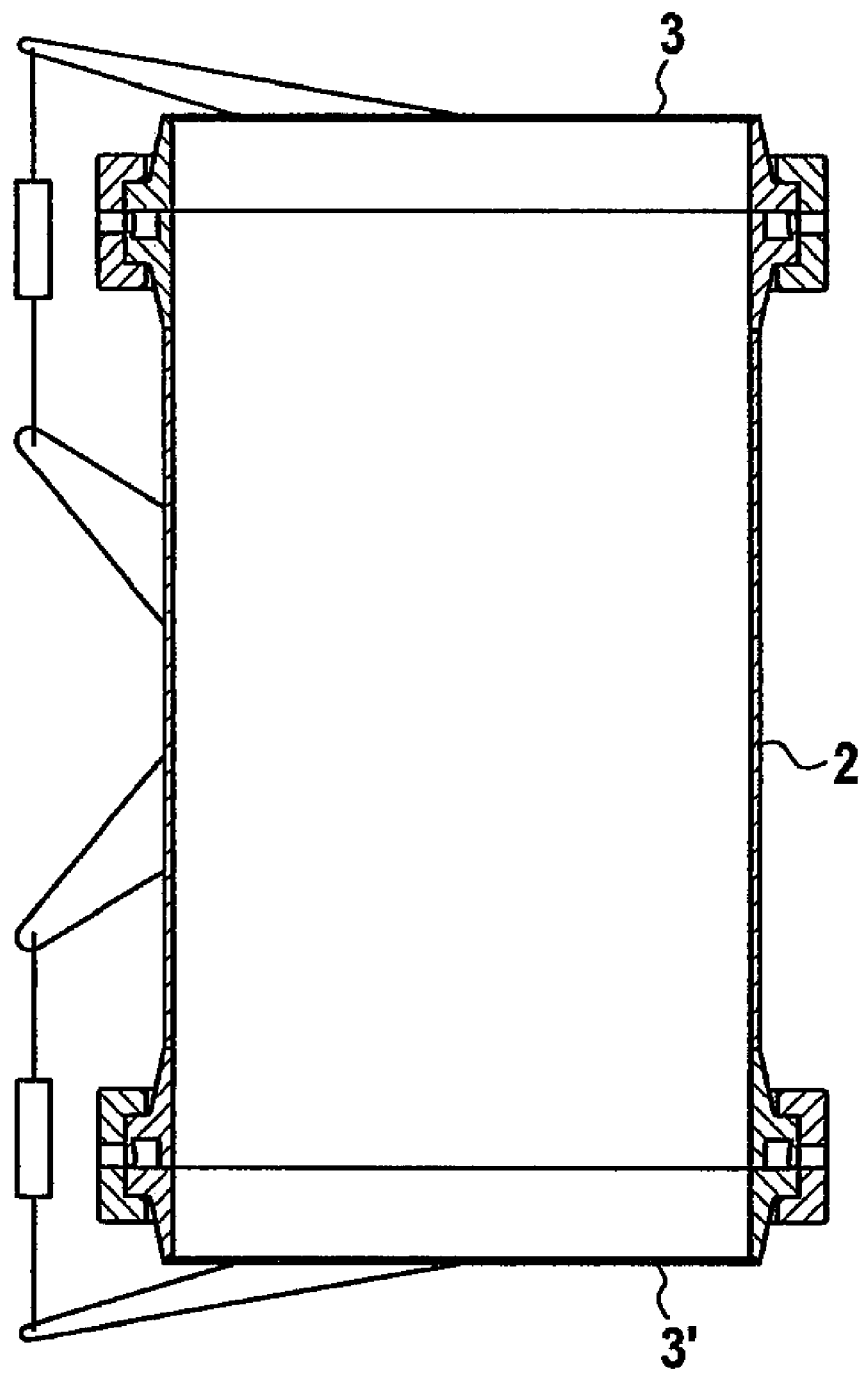

With reference mainly to FIG. 1, it can be seen that the vessel 1 comprises a body 2 and a lid 3. In this embodiment, the lid 3 is used for loading and unloading articles, although it is also possible to envisage using a vessel having a second lid 3' at its other end, such as in, for example, FIG. 6.

The body 2 is preferably constituted by a cylindrical portion closed at its end. However the vessel could present entirely different shapes depending on the intended application.

Said vessel 1 also includes connection means 4 between said body 2 and said lid 3. In the invention, the connection means 4 comprise an open clamping ring 5 of U-shaped section defining a groove 6 suitable for clamping together respective flanges 8 and 9 on the lid 3 and on the body 2.

In the example of FIGS. 1 to 4, it can be seen that the flange 9 of said body 2 is situated at the periphery of said body 2, allowing the vessel 1 a maximum amount of opening. Nevertheless, it would also be possible to provide for the body 2 to present a top surface constituted by a ring with the flange 9 being situated at the inside edges of the ring, thus defining an opening that is smaller than the section of said vessel 1.

Said connection means 4 further comprise engagement-and-disengagement means 10 enabling the clamping ring 5 to be deformed and moved relative to the flanges 8 and 9 so as to enable the vessel 1 to be opened and closed.

Figure 2:
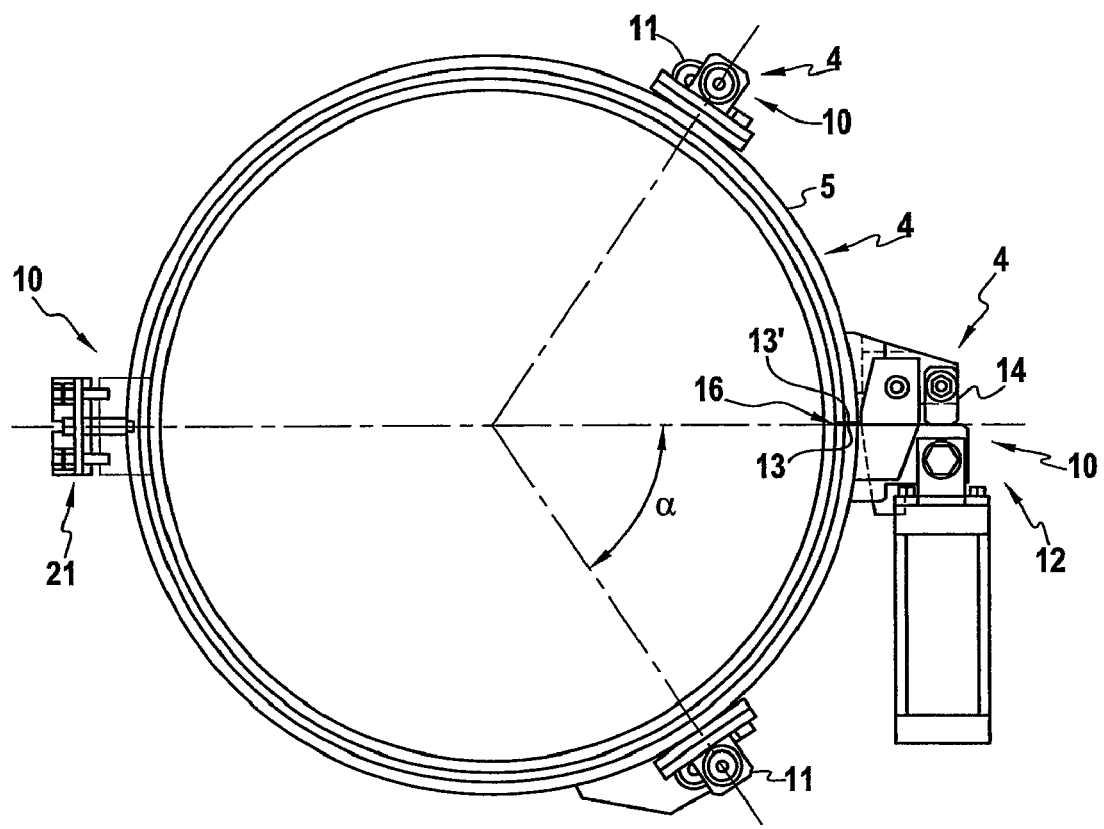
FIG. 2 is a section view from above of a vessel made in accordance with the invention.
Figure 3:
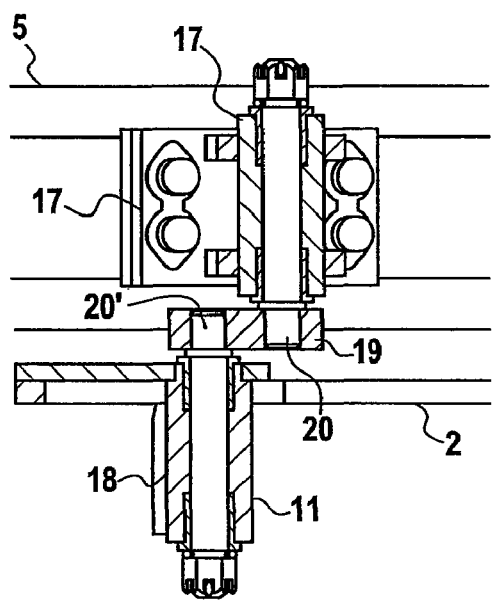
FIGS. 3 to 6 are detail views showing elements of the vessel made in accordance with the invention.
Figure 4:
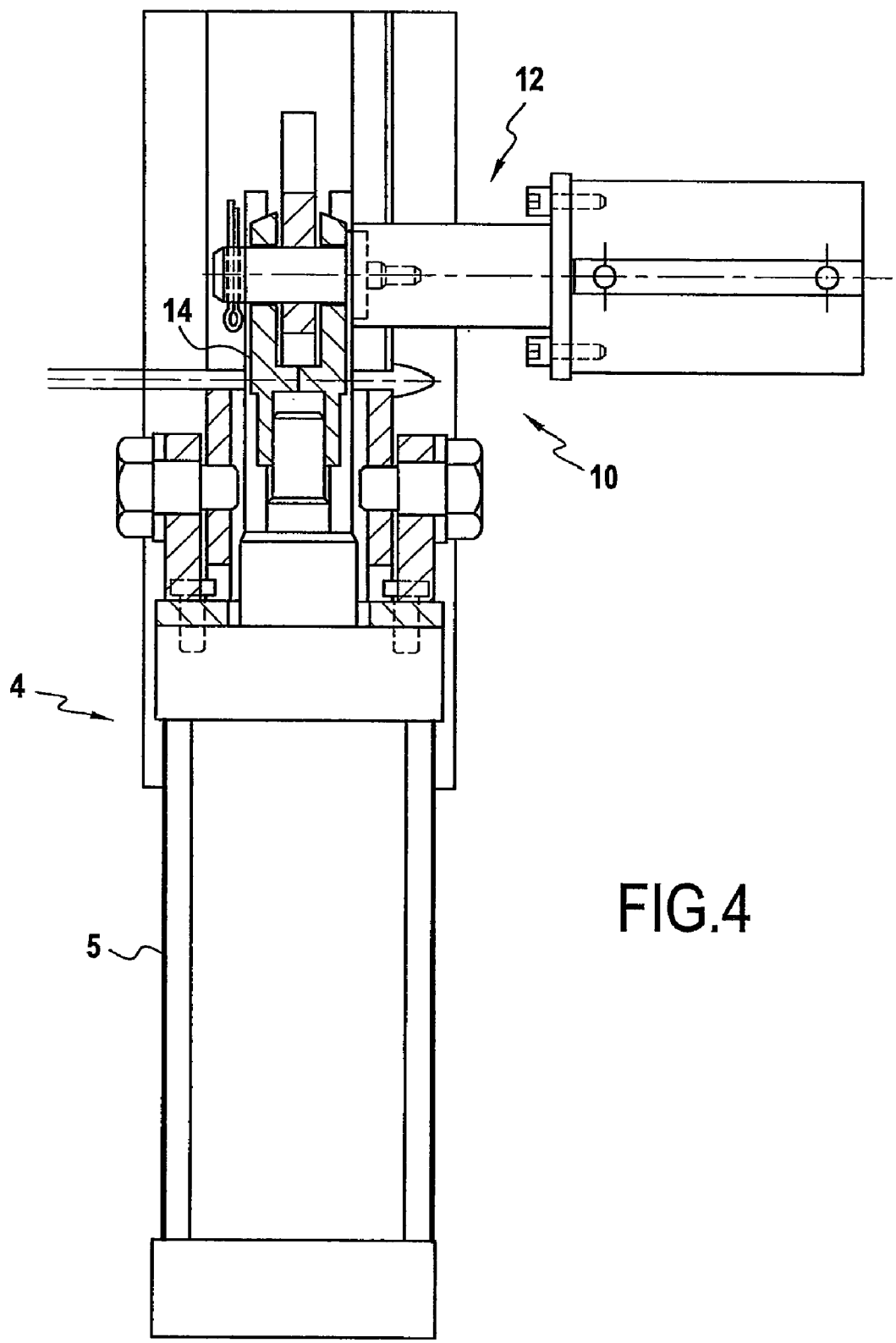

With reference mainly to FIGS. 2 to 4, it can be seen that the engagement-and-disengagement means 10 comprise at least two hinge elements 11 co-operating with spreader means 12 for opening the clamping ring 5.

The term "engagement" when used for the clamping ring 5 should be understood as moving the clamping ring 5 in such a manner that the flanges 8 and 9 are placed in the groove 6, with engagement being fully achieved when the ends 13, 13' of the opening in the clamping ring 5 come into contact.

The term "disengagement" when applied to the clamping ring 5 should be understood as moving the clamping ring 5 into a position that allows the lid 3 to be disengaged from the body 2.

With reference to FIG. 4, it can be seen that the spreader means 12 are constituted by an actuator 14 having anchor points distributed on either side of the opening 16 in the clamping ring 5. Advantageously, the actuator 14 is suitable for being controlled by an electromagnetic control device.

Provision can also be made for said actuator 14 to be provided with a safety spring serving to lock the actuator in the event of it failing, thus preventing the ends 13, 13' of the opening in the clamping ring 5 from spreading apart.

With reference to FIG. 3, there can be seen a hinge element 11. This hinge element 11 comprises a first portion 17 connected to the clamping ring 5. Said hinge element 11 also comprises a second portion 18 connected to the body 1, and a third portion 19 connected to the first and second portions via two transmission pins.

It is important to emphasize at this point that provision could optionally be made for the second portion 18 to be connected to the lid 3 and not to the body 2, with the operation of the hinge element 11 being unchanged thereby.

The vessel 1 is opened and closed as follows, an operator causes the actuator 14 to move so as to spread apart the ends 13, 13' of the opening in the clamping ring 5. The pressure exerted by the actuator 14 deforms the clamping ring 5, which is preferably made of a metal that presents a certain amount of elasticity.

This spreading apart of the ends 13, 13' increases the section of the clamping ring 5. The hinge elements 11 enable the deformation and the displacement of the clamping ring 5 to be controlled so that the flanges 8 and 9 are disengaged from the groove 6 in the clamping ring over their entire length. For this purpose, provision is made for the third portions 19 of the hinge elements 11 to be constituted by respective plates, each having two holes 20, 20' forming bearings for the transmission pins and such that the distance between the holes 20, 20' allows the clamping ring 5 to be spaced apart from the flanges 8 and 9 by a distance greater than the depth of the groove 6.

The combined action of the actuator 14 and of the hinge elements 11 thus enables the clamping ring 5 to be deformed regularly and disengage. It is important at this point to emphasize that the position of the hinge elements 11 on the clamping ring is of great importance in order to be able to achieve good deformation. For this purpose, when the clamping ring 5 is circular in the engaged position, a value is selected for the angle α, corresponding to the angle formed at the center of the clamping ring between a hinge element 11 and the opening in the clamping ring, such that α lies in the range 50° to 65°.

In order to make the clamping ring 5 easier to move, it is advantageous to provide for the engagement-and-disengagement means 10 to include means 21 for guiding the clamping ring 5.

Figure 5:
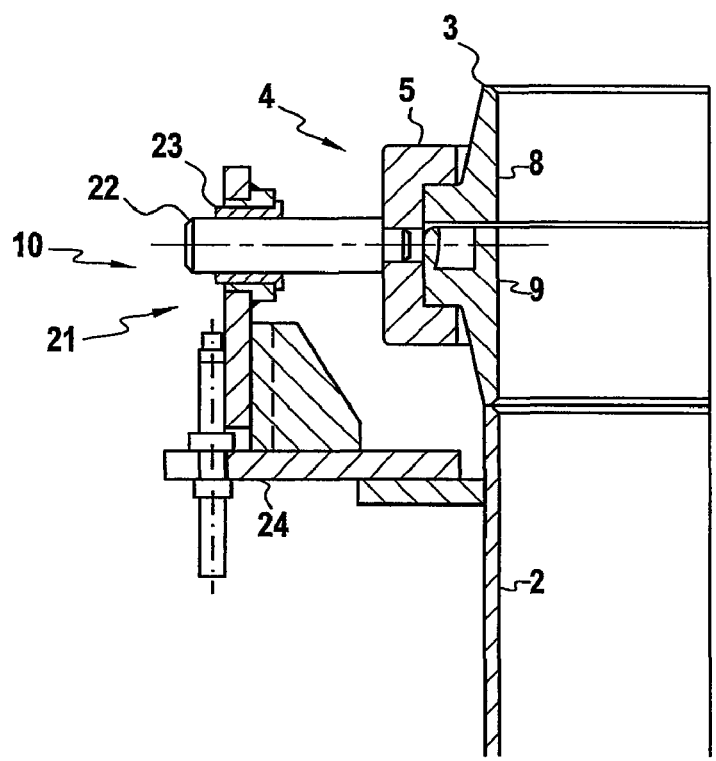

With reference to FIG. 5, there can be seen an embodiment of such guide means 21, which guide means are constituted by a rod 22 connected to said clamping ring 5 and passing through a guide bearing 23 formed in a support 24, said support being connected in the example of FIG. 5 to the body 2, but like the hinge means 11, in a different embodiment it could be connected to the lid 3.

Thus, even if there is a small mount of unbalance in the placing of the hinge elements 11, the clamping ring can move only along the axis of the rod 22, thus ensuring that there is no deflection of the clamping ring 5, as a whole.

With reference to FIG. 2, it can be seen that the guide means 21 are diametrically opposite the opening in the clamping ring 5. The rod 22 is rectilinear and thus allows the clamping ring 5 to move only along the axis formed by the opening and said rod 22.

In order to engage the clamping ring 5 so as to connect together said body 2 and the lid 3, the operator actuates the actuator 4, thereby moving the ends 13 and 13' towards each other, with the clamping ring 5 being deformed again by co-operation between the hinge elements 11 and the actuator 4, and with displacement being controlled by the guide means 21.

It is important to observe at this point, that when the clamping ring 5 is in the rest state, it advantageously takes up a shape that is intermediate between the shapes it takes up when in the engaged position and when in the disengaged position. This characteristic serves to limit the force needed for engaging and disengaging the clamping ring 5.

Nevertheless, in a variant, it is also possible to envisage making a clamping ring that, in the rest state, takes up the shape of the clamping ring when in the engaged position. The main purpose of such a configuration is to keep the minimum force for engaging the clamping ring 5 as small as possible, but that requires increased force for disengaging it. This variant is particularly useful when the working cycle of the vessel 1 includes long durations during which the clamping ring 5 is to remain engaged.

It is also advantageous to emphasize that a gasket may be provided in the clamping ring 5 in its groove 6, and means may be provided for pressurizing said gasket. This characteristic makes it possible to improve the sealing of the vessel 1 as a whole.

Finally, lifting means 25 are provided on the vessel 1 for lifting the lid 3. In conventional manner, these means are constituted by an actuator 26 having one end connected to the body 2 and its other connected to the lid 3 either directly or via reinforcing pieces 27 enabling the lid 3 to be tilted vertically relative to the body 2.

Naturally, other embodiments within the competence of the person skilled in the art could be envisaged without thereby going beyond the ambit of the invention as defined by the following claims.

What is claimed is:

1. A vessel, in particular for treating articles under pressure, the vessel comprising a body having a flange, at least one lid having a flange, and connection means for connecting the body and said at least one lid, wherein the connection means comprise:
   a clamping ring having a U-shaped section defining a groove suitable for clamping together the flanges of the lid and the body, and first and second ends being configured to spread apart to form an opening therebetween; and
   engagement-and-disengagement means enabling the clamping ring to be deformed and moved relative to the flanges in such a manner as to enable the vessel to be opened and closed;
   wherein the engagement-disengagement means comprises spreader means for spreading apart the ends to open the clamping ring, at least two hinge elements and guide means, for guiding the clamping ring, which are diametrically opposite the opening in the clamping ring and between the two hinge elements;

wherein the guide means are constituted by a rod connected to said clamping ring and passing through a guide bearing formed on a support connected to the body or to the lid, wherein an axis is formed by the rod, which is diametrically opposite the opening in the clamping ring, such that the clamping ring moves only along this axis, and wherein two hinges co-operate with the spreader means for controlling the deformation and the displacement of the clamping ring so that the flanges of the lid and the body are disengaged over their respective entire lengths from the groove of the clamping ring.

2. A vessel according to claim 1, in which the spreader means are constituted by an actuator having anchor points distributed on either side of the opening in the clamping ring.

3. A vessel according to claim 1, in which the clamping Ring in the engaged position is circular and the angle formed at the center of the clamping ring between the hinge element and the opening in the clamping ring lies in the range 50° to 65°.

4. A vessel according to claim 1, in which the clamping ring in the rest state has a shape that is intermediate between the shapes it takes up in the engaged position and in the disengaged position, thereby limiting the force needed for engaging and disengaging the clamping ring.

5. A vessel according to claim 1, in which the clamping ring in the rest state has the shape of the clamping ring in the engaged position so as to keep the minimum force needed for engaging the clamping ring as small as possible.

6. A vessel according to claim 1, including lifting means for lifting the lid.

7. A vessel according to claim 1, including a second lid.

8. A vessel according to claim 1, wherein a gasket is provided in the clamping ring.

9. A vessel according to claim 1, in which each hinge element comprises a first portion connected to the clamping ring, a second portion connected to the lid or to the body, and a third portion linked to the first and second portions via two transmission pins.

10. A vessel according to claim 9, in which the third portion is a plate having two holes forming bearings, with the distance between the holes enabling the clamping ring to be spaced apart from the flanges by a distance greater than the depth of the groove.

* * * * *